United States Patent [19]

Glendenning et al.

[11] Patent Number: 4,493,181

[45] Date of Patent: Jan. 15, 1985

[54] ATTACHMENT FOR THE SNOUTS OF COMBINES AND THE LIKE

[75] Inventors: George B. Glendenning; Terry S. Glendenning, both of Davis Junction, Ill.

[73] Assignee: Farmer's Factory Co., Lee, Ill.

[21] Appl. No.: 609,589

[22] Filed: May 14, 1984

[51] Int. Cl.³ .............................................. A01D 45/02
[52] U.S. Cl. ............................................ 56/314; 56/119
[58] Field of Search ................................. 56/314–320, 56/119, 98

[56] References Cited

U.S. PATENT DOCUMENTS

| | | | |
|---|---|---|---|
| 1,277,257 | 8/1918 | Porterfield | 56/314 |
| 2,349,905 | 5/1944 | Hyman | 56/119 |
| 3,352,093 | 11/1967 | Proctor | 56/98 |
| 3,365,865 | 1/1968 | Waldrop | 56/16 |

FOREIGN PATENT DOCUMENTS 960371  6/1964  United Kingdom ................. 56/314

Primary Examiner—Jay N. Eskovitz
Attorney, Agent, or Firm—Leydig, Voit, Osann, Mayer & Holt, Ltd.

[57] ABSTRACT

An attachment for the snout of a combine includes a plate which is disposed above the snout and is inclined upwardly and rearwardly at an angle greater than the angle of the upper surface of the snout to provide a steeper surface for engaging and lifting a down crop. The plate extends above the conventional ear saver which thereby may remain in place to prevent corn ears from being ejected from the combine. The forward end of the plate is fastened to the snout and the rear end is supported on the ear saver by a sliding connection which permits the forward part of the snout to tilt up as it encounters mounds of earth and the like.

7 Claims, 4 Drawing Figures

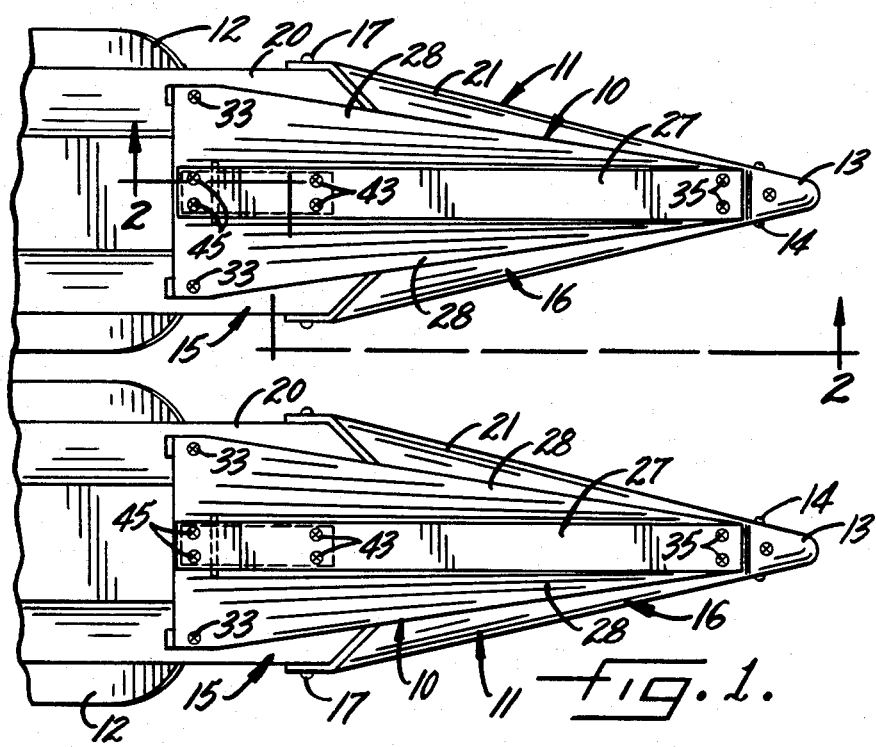
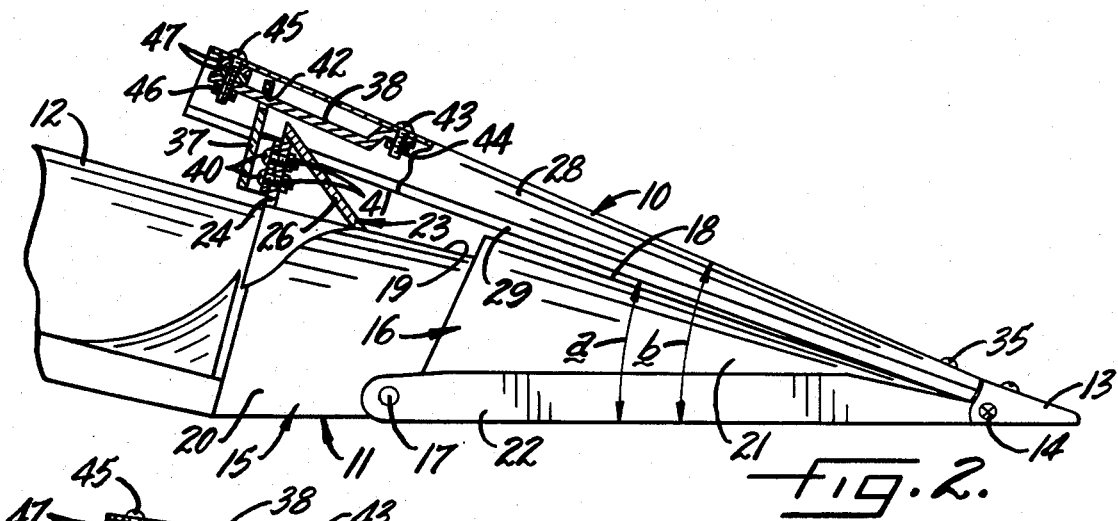
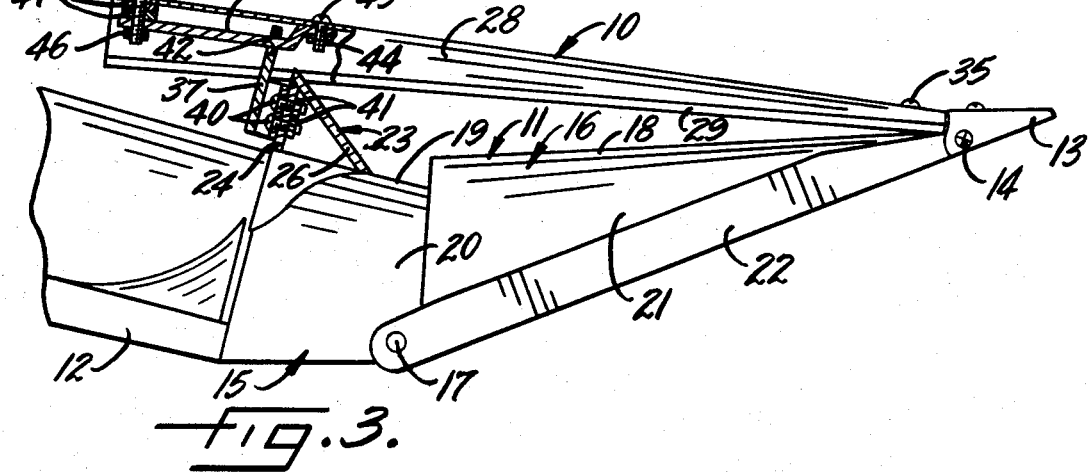

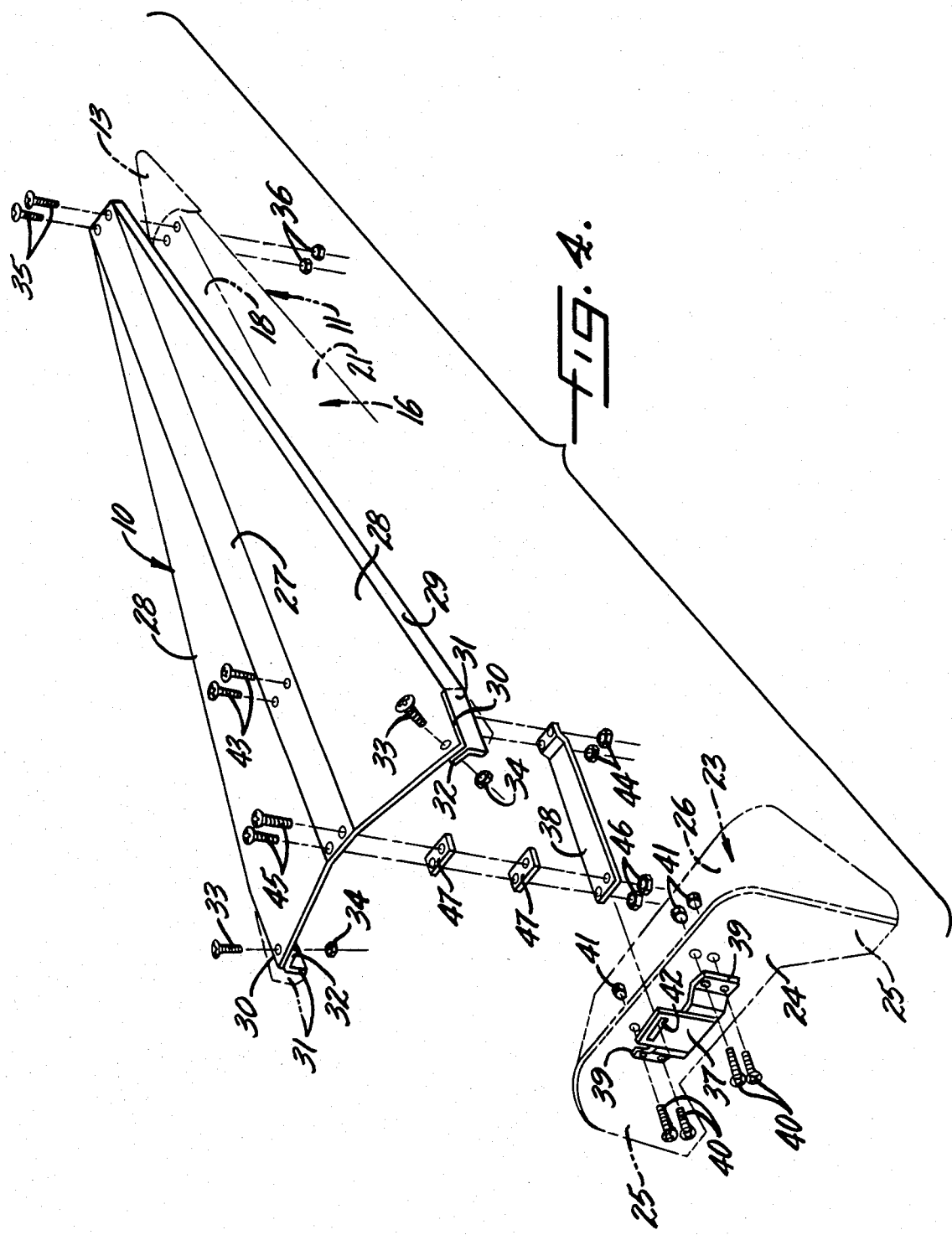

ATTACHMENT FOR THE SNOUTS OF COMBINES AND THE LIKE

BACKGROUND OF THE INVENTION

This invention relates to snouts commonly used on combines and the like to raise a down crop such as corn and to guide the crop into the combine. Such a snout usually has a pointed forward end and increases in size both transversely and vertically to present an upper surface which is inclined upwardly and rearwardly to engage and lift the crop. The snout includes a forward part which is hinged on a rearward part to swing up and down about a transverse axis as the snout engages mounds of earth and the like. When the crop is corn, a deflector known as an ear saver projects from the rearward part of the snout to prevent the stripper plates associated with the snapping rollers and the feed auger of the combine from ejecting the corn ears.

When operating on a down crop such as corn, the snouts present a number of problems. For example, many of the corn stalks will lie across the paths of two or more snouts so that one snout guides the stalk into the snapping rollers for one row of corn while the stalk goes underneath the snapping rollers for the adjacent row. This often results in severe tangling of the stalk. In addition, the ear saver causes the stalks to gather at the entrance of the snapping rollers. Because of this, the ear savers often are removed for down corn but this results in many ears being ejected.

SUMMARY OF THE INVENTION

The general object of the invention is to provide a novel attachment for a snout of the foregoing type which attachment presents a smooth but steeper surface to lift the crop faster and reduce tangling and which also permits an ear saver to be used without adverse effects.

A more detailed object is to form the attachment as a straight and comparatively rigid member which is disposed above the snout and is inclined at an angle greater than the upper surface of the snout with the forward end of the member attached to the snout and the rear end supported by a slidable connection to permit the upward swinging of the forward part of the snout.

Another object is to extend the member over the ear saver so that the latter is not engaged by the stalks which thereby are guided to the combine by a continuous surface.

The invention also resides in the details of the construction of the member and of the slide connection.

BRIEF DESCRIPTION OF THE DRAWINGS

FIG. 1 is a fragmentary top plan view of a combine utilizing attachments embodying the present invention.

FIG. 2 is an enlarged fragmentary sectional view taken along the line 2—2 in FIG. 1.

FIG. 3 is a view similar to FIG. 2 but showing the forward part of the snout in a raised position.

FIG. 4 is an exploded perspective view of the snout and the attachment.

DETAILED DESCRIPTION OF THE PREFERRED EMBODIMENT

As shown in the drawings for purposes of illusration, the invention is embodied in attachments 10 in the form of slides for the snouts 11 of a farm implement such as a combine (not shown). As is customary with such an implement, the snouts are mounted on and project forwardly from the head 12 of the combine and are spaced apart equally across the head so that the snouts travel along the ground between the rows of a crop such as corn. In order to raise low lying down corn, the forward end 13 of each snout is pointed and gradually increases in size toward the rear both transversely and vertically. The pointed tip 13 on the snout is formed by a sheet metal piece which covers the forward end of the snout and is fastened to the latter by screws 14. Preferably, the upper surface of the snout is flat and the sides are flared outwardly and are curved convexly generally in the shape of a cone. With this arrangement, the snouts raise the stalks of the down corn and guide the corn to snapping rollers (not shown) in the head, a pair of snapping rollers being located between each pair of snouts.

The snouts 11 travel at or near ground level and the points 13 of the snouts swing up to ride over mounds in the ground. In order that the points of the snouts may swing up, each snout is made in two parts 15 and 16 with the rearward part 15 being rigidly attached to the head 12 and the forward part 16 being hinged to the rearward part as indicated at 17 to swing about a transverse horizontal axis disposed slightly above the lower edge of the snout. Herein, the parts have similar cross sectional shapes and the rear of the forward part 16 overlaps but is somewhat larger than the front of the rearward part 15 to permit the forward part to swing up from its lower position illustrated in FIG. 2 to a raised position such as is shown in FIG. 3. Thus, the upper surface 18 (FIGS. 2 and 3) of the forward part 16 is inclined to horizontal at the angle a and the upper surface 19 of the rearward part 15 is inclined upwardly at a similar angle. The parts 15 and 16 are formed with integral curved side walls 20 and 21 which have the conical shape described above and, along the lower edges, the side walls 21 are flattened as indicated at 22. The flattened portions are extended rearwardly and are pivotally connected to the rearward part by pins which form the hinge 17.

After the ears are stripped from the corn stalks, there is a tendency for the stripper plates and the feed auger to eject them forwardly. To keep the ears in the head, therefore, deflectors 23, commonly known as ear savers, are mounted on and project upwardly from the rear ends of the rearward parts 15 of the snouts 11 where they return any ears that may be ejected. Herein, each deflector includes a plate 24 (FIG. 4) which extends transversely across the top of the part 15 at the rear thereof and which is formed with depending legs 25 to follow the contour of the side walls 20. To support the plate and add rigidity, a shield 26 projects forwardly and downwardly from the upper and side edges of the plate and bears against the upper side of the part 15. Usually, the deflector is removably mounted on the part 15 by any suitable means (not shown).

When a crop such as corn is lying down, a combine equipped with snouts 11 constructed as described above frequently encounter conditions which produce problems. For example, a corn stalk which falls across adjacent rows may be engaged primarily by one snout but enter the snapping rollers associated with a different snout and the stalk then often becomes entangled in and around the snouts. In other instances, the snouts do not raise the stalks fast enough to keep all the ears from passing under the snapping rollers. Also, the deflectors 23 usually have to be removed for down corn to keep the stalks from gathering at the entrance to the snapping rollers but this permits ears to be ejected.

The present invention contemplates the provision of a novel attachment 10 for a snout 11 to provide a smooth but steeper surface to lift the crop at a faster rate so that, with corn as an example, stalks are engaged by the proper snapping rollers and ears do not pass under these rollers. At the same time, the deflector 23 may be left in place to prevent ears from being ejected but stalks do not gather at the entrance to the snapping rollers. Moreover, the attachment is constructed and mounted in such way that it extends the full length of the snout but still does not interfere with the swinging of the tip of the snout. To these ends, the attachment is a straight comparatively rigid member disposed above both the forward and rear parts 16 and 15 of the snout and inclined upwardly and rearwardly at an angle greater than the angle a of the upper surfaces 18 and 19 of the snout parts and the forward end of the member is attached to the snout while the rear end is slidable endwise relative to the snout when the part 16 is swung about the hinge 17.

In the preferred embodiment, the member 10 is an elongated sheet metal plate having a flat center portion 27 which is rectangular and which extends over the forward and rearward parts 16 and 15 of the snout 11 and above and beyond the deflector 23. The center portion is inclined upwardly and rearwardly at an angle b which is greater than the angle a so that the spacing of the center portion above the snout increases progressively toward the rear. The width of the flat center portion is approximately the same as the widths of the upper surfaces 18 and 19 of the parts 16 and 15 of the snout and the forward edge of this portion is disposed just behind the point piece 13. As an integral part of the plate 10, side wings 28 project laterally and downardly from the center portion and are generally right triangles in shape with the apex at the forward end. Thus, the overall shape of the plate is tapered forwardly and the plate substantially overlies the snout. For strength, a narrow flange 29 projects down from the outer edge of each wing. Adjacent the rear of the plate 10, the outer edges of the wings are cut to provide short longitudinal edges 30 and the adjacent parts 31 of the flanges 29 are bent inwardly as shown in FIG. 4. A tab 32 formed on each flange part 31 projects in under the associated wing and is fastened to the latter by a bolt 33 and a nut 34 (FIG. 4) so as to maintain the spacing between adjacent snouts.

At its forward end, the plate 10 is fastened to the snout 11 by bolts 35 which project through the center portion 27 of the plate and through the upper surface 18 of the forward part 16 and are threaded into bolts 36. Means is provided to support the rear of the plate on the snout for endwise sliding relative to the rearward part 15 of the snout to accommodate the swinging of the forward part. This means comprises coacting elements 37 and 38 which are mounted respectively on the rearward part 15 of the snout and on the plate 10 with the element 38 sliding on the element 37. Herein, the element 37 is a bracket with side wings 39 (FIG. 4) which are fastened to the deflector plate 24 by bolts 40 and nuts 41. The bracket projects up above the top of the deflector plate and is formed with a horizontal slot 42 and the element 38 is a longitudinal bar projecting loosely through the slot with enough vertical clearance to accommodate the changing angle of the plate 10. The forward end portion of the bar is bent upwardly against the underside of the center portion 27 of the plate 10 and is secured to the latter by bolts 43 and nuts 44 while the rear of the bar is fastened to the center portion by bolts 45 and nuts 46 with shims 47 holding the bar in spaced relation to the plate.

With the foregoing arrangement, the upper side of the plate 10 presents an appreciably steeper surface to a down crop such as corn whereby the stalks are raised faster and do not tend to become tangled. The plate is disposed above the ear saver deflector plate 24 which remains in place and continues to prevent the corn ears from being ejected from the head 12. As the snout 11 encounters mounds and the like, the forward part 16 tilts up and the slide 37, 38 accommodates the plate 10 in this tilting. During such tilting, the angle between the forward snout part and the plate changes slightly but this may be permitted either by a slight resilient flexing of the plate.

We claim:

1. An attachment for the snout of a combine wherein the snout includes a forward portion having a pointed forward end and being hinged adjacent its rear to a rear portion fixed to the head of the combine and wherein the upper surfaces of said forward and rear portions are inclined upwardly and rearwardly at a predetermined angle from the front to the rear of the snout, said forward portion being adapted to swing up and down relative to said rear portion, said attachment having, in combination, a straight comparatively rigid member having a straight upper surface disposed above the upper surfaces of said forward and rear portions of said snout, said member extending rearwardly from said pointed forward end of said forward portion, means fastening the forward end of said member to said forward portion of said snout, said member being inclined upwardly and rearwardly at an angle greater than said predetermined angle whereby the spacing of the member above said snout increases progressively toward the rear of the snout, and slide means on said member and on said snout and supporting the rear of the member for sliding relative to said rear portion of the snout when said forward portion swings up and down.

2. An attachment for the snout of a combine wherein said snout comprises a rear portion fixed to and projecting forwardly from the head of the combine, a forward portion projecting forwardly from said rear portion and being tapered forwardly toward a pointed forward end, said forward portion being hinged at the rear thereof to said rear portion to swing up and down about a horizontal axis, the upper sides of said forward and rear portions being inclined upwardly and rearwardly from said pointed forward end at a predetermined angle, and a deflector rigidly attached to the upper side of said rear portion adjacent the rear thereof and projecting upwardly above said rear portion, said attachment having, in combination, an elongated rigid plate disposed above the upper sides of said forward and rear portions and above said deflector and extending from said pointed forward end rearwardly to a point behind said deflector, means fastening the forward end of said plate to said forward portion adjacent the pointed forward end thereof, said plate being inclined upwardly and rearwardly at an angle greater than said predetermined angle and the spacing of the plate above said snout increasing progressively from the forward end to the rear, and means supporting said plate for endwise sliding relative to said rear portion as said forward part is swung up and down while maintaining the plate above said deflector.

3. An attachment as defined in claim 2 in which said plate is tapered forwardly to substantially overlie said snout.

4. An attachment as defined in claim 2 in which said plate includes a longitudinally extending rectangular center portion and two integral wings, one projecting laterally and downwardly from each side of said center portion, said wings being tapered forwardly whereby said plate substantially overlies said snout.

5. An attachment for the snout of a combine wherein said snout comprises a rear portion fixed to and projecting forwardly from the head of the combine, a forward portion projecting forwardly from said rear portion and being tapered forwardly toward a pointed forward end, said forward portion being hinged at the rear thereof to said rear portion to swing up and down about a horizontal axis, the upper sides of said forward and rear portions being inclined upwardly and rearwardly from said pointed forward end at a predetermined angle, and a deflector rigidly attached to the upper side of said rear portion adjacent the rear thereof and projecting upwardly above said rear portion, said attachment having, in combination, an elongated rigid plate disposed above the upper sides of said forward and rear portions and above said deflector and extending from said pointed forward end rearwardly to a point behind said deflector, means fastening the forward end of said plate to said forward portion adjacent the pointed forward end thereof, said plate being inclined upwardly and rearwardly at an angle greater than said predetermined angle and the spacing of the plate above said snout increasing progressively from the forward end to the rear, and means supporting said plate for endwise sliding relative to said rear portion as said forward part is swung up and down while maintaining the plate above said deflector, said means including a first part secured to said plate and a second part secured to said rear portion, one of said parts being formed with a slot and the other of said parts slidably extending through the slot.

6. An attachment as defined in claim 5 in which said first part is fastened to said deflector and projects above the latter and said slot is formed in said first part and is disposed above the deflector.

7. An attachment as defined in claim 6 in which said second part is an elongated bar secured to and spaced beneath the underside of said plate and said bar extends through said slot.

* * * * *